United States Patent
Tulloch et al.

(10) Patent No.: US 12,377,992 B2
(45) Date of Patent: Aug. 5, 2025

(54) AIRCRAFT WING-PYLON CONNECTION

(71) Applicant: AIRBUS OPERATIONS LIMITED, Bristol (GB)

(72) Inventors: William Tulloch, Bristol (GB); Pat Broomfield, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 101 days.

(21) Appl. No.: 17/605,567

(22) PCT Filed: Aug. 17, 2020

(86) PCT No.: PCT/EP2020/072950
§ 371 (c)(1),
(2) Date: Oct. 21, 2021

(87) PCT Pub. No.: WO2021/032656
PCT Pub. Date: Feb. 25, 2021

(65) Prior Publication Data
US 2022/0204175 A1   Jun. 30, 2022

(30) Foreign Application Priority Data
Aug. 20, 2019   (GB) ..................... 1911915

(51) Int. Cl.
B64D 27/26   (2006.01)
B64C 3/32   (2006.01)
B64D 27/40   (2024.01)

(52) U.S. Cl.
CPC ............... B64D 27/40 (2024.01); B64C 3/32 (2013.01); B64D 27/404 (2024.01)

(58) Field of Classification Search
CPC ...... B64D 27/26; B64D 2027/266; B64C 3/32
See application file for complete search history.

(56) References Cited

U.S. PATENT DOCUMENTS

| 5,871,177 A | 2/1999 | Demouzon et al. |
| 2004/0129832 A1* | 7/2004 | Marche ................. B64D 27/26 244/54 |
| 2005/0151008 A1 | 7/2005 | Machado et al. |

(Continued)

FOREIGN PATENT DOCUMENTS

| FR | 2 887 522 | 12/2006 | |
| FR | 2887522 A1 * | 12/2006 | ............. B64D 27/18 |

(Continued)

OTHER PUBLICATIONS

FR-2956706-A1 Translation (Year: 2011).*

(Continued)

*Primary Examiner* — Kimberly S Berona
*Assistant Examiner* — Steven J Shur
(74) *Attorney, Agent, or Firm* — Nixon & Vanderhye P.C.

(57) ABSTRACT

An aircraft assembly is disclosed having a wing and an engine mounting pylon. An aft end of the engine mounting pylon is connected to the wing by a spigot and at least one fastener. The aircraft assembly is configured such that, during operation of the aircraft assembly on an aircraft, the spigot transfers only lateral load between the engine mounting pylon and the wing and the at least one fastener transfers only vertical load between the engine mounting pylon and the wing.

11 Claims, 5 Drawing Sheets

(56) References Cited

U.S. PATENT DOCUMENTS

| | | | |
|---|---|---|---|
| 2009/0108127 A1 | 4/2009 | Cazals | |
| 2011/0114786 A1* | 5/2011 | Guillet | B64D 27/40 244/54 |
| 2012/0080582 A1* | 4/2012 | Rogero | B64D 27/26 248/554 |
| 2012/0286126 A1* | 11/2012 | Gallet | F01D 25/162 248/554 |
| 2015/0013142 A1* | 1/2015 | West | B64D 27/26 29/525.08 |
| 2017/0096229 A1* | 4/2017 | Pautis | F02K 1/08 |
| 2019/0202572 A1 | 7/2019 | Pautis et al. | |

FOREIGN PATENT DOCUMENTS

| | | | | |
|---|---|---|---|---|
| FR | 2 956 706 | | 8/2011 | |
| FR | 2956706 A1 | * | 8/2011 | B64D 27/18 |

OTHER PUBLICATIONS

FR-2887522-A1 Translation (Year: 2006).*
Written Opinion of the ISA with International Search Report for PCT/EP2020/072950, mailed Nov. 18, 2020, 12 pages.
United Kingdom Examination Report for European Application No. GB1911915.5, three pages, dated Sep. 6, 2021.
United Kingdom Search Report for European Application No. GB1911915.5, four pages, dated Feb. 10, 2020.

* cited by examiner

US 12,377,992 B2

AIRCRAFT WING-PYLON CONNECTION

CROSS REFERENCE TO RELATED APPLICATIONS

The present application is a National Phase of International Application Number PCT/EP2020/072950 filed Aug. 17, 2020, which designated the U.S. and claims priority benefits from Great Britain Application Number GB 1911915.5 filed Aug. 20, 2019, the entire contents of each of which are hereby incorporated by reference.

TECHNICAL FIELD

The present invention relates to an aircraft assembly comprising a wing and an engine mounting pylon connected to the wing, and to an aircraft comprising such a connected wing and pylon.

BACKGROUND

Most conventional aircraft have engines mounted to the wings by engine mounting pylons. For commercial airliners there is a trend toward higher bypass ratio engines, which have larger diameters than lower bypass ratio engines. To accommodate large diameter engines whilst maintaining sufficient clearance between the engine and the ground it is desirable to minimize the vertical distance between the top of the engine and the lower surface of the wing.

Conventionally, an engine mounting pylon is attached to a wing box by a set of couplings interposed vertically between the wing box and the primary structure of the pylon, which generally constitute a statically determined interface, or one with a low level of hyperstaticity. These couplings transmit forces between the engine mounting pylon and the wing box, including the thrust loads generated by the engine, and at the same time allow a certain freedom of movement between both components (due to the loading and rigidity of the pylon and wing box). Known designs of such couplings require the top surface of the engine mounting pylon to be spaced apart vertically from the lower surface of the wing box, and are therefore not suitable for use with very large diameter engines.

SUMMARY

A first aspect of the present invention provides an aircraft assembly comprising a wing and an engine mounting pylon. An aft end of the engine mounting pylon is connected to the wing by a spigot and at least one fastener. The aircraft assembly is configured such that, during operation of the aircraft assembly on an aircraft, the spigot transfers only lateral load between the engine mounting pylon and the wing and the at least one fastener transfers only vertical load between the engine mounting pylon and the wing.

Optionally, the aircraft assembly is configured such that the spigot transfers only lateral load perpendicular to the direction of travel of the aircraft.

Optionally, the aircraft assembly is configured such that the spigot transfers lateral load parallel to and perpendicular to the direction of travel of the aircraft.

Optionally, the spigot extends upwardly from an upper surface of the engine mounting pylon.

Optionally, a lower surface of the wing comprises an opening configured to receive the free end of the spigot.

Optionally, the opening comprises a slot having a long axis which extends parallel to the direction of travel of the aircraft.

Optionally, the opening is configured to match the cross-sectional profile of the spigot such that relative lateral movement of the spigot and the opening is substantially prevented.

Optionally, the lower surface of the wing comprises a fitting, and wherein the spigot and the at least one fastener are engaged with the fitting.

Optionally, the wing comprises a lower cover, and the fitting is attached to the lower cover.

Optionally, the fitting is between a top surface of the engine mounting pylon and the lower cover.

Optionally, the vertical height of the fitting is less than 100 mm.

Optionally, the spigot is a failsafe spigot.

Optionally, the at least one fastener is a failsafe fastener.

A second aspect of the present invention provides an aircraft comprising the assembly of the first aspect.

Optionally, the aircraft further comprises an ultra-high bypass ratio (UHBR) engine mounted on the engine mounting pylon.

BRIEF DESCRIPTION OF THE DRAWINGS

Embodiments of the invention will now be described, by way of example only, with reference to the accompanying drawings, in which:

FIG. 1b is a schematic top view of an engine mounting pylon of the example aircraft assembly of FIG. 1a;

FIG. 3b is a top view of an engine mounting pylon of the example aircraft assembly of FIG. 3a;

FIG. 3c is a perspective view of the example aircraft assembly of FIG. 3a;

FIG. 3d is a cross section through the example aircraft assembly of FIG. 3a.

DETAILED DESCRIPTION

The following examples each relate to an aircraft assembly comprising a wing and an engine mounting pylon, where an aft end of the engine mounting pylon is connected to the wing by a spigot and at least one fastener. The aircraft assembly is configured such that, during operation of the assembly on an aircraft, the spigot transfers only lateral load between the engine mounting pylon and the wing, and the (or each) fastener transfers only vertical load between the engine mounting pylon and the wing. That is, the spigot does not transfer any vertical load, and the (or each) fastener does not transfer any lateral load.

Example aircraft assemblies according to the invention provide the advantage that relatively little torsional load is applied to the wing structure during operation of the aircraft. This is because the vertical height of the spigot and fastener(s) is relatively small compared to alternative known arrangements in which a fitting having a relatively large vertical height connects a rear surface or side surface of the aft end of the engine mounting pylon to the wing. Reducing the torsional load applied to the wing structure means that the need to reinforce the wing structure at the location where it is engaged with the pylon connection mechanism is reduced. This in turn can reduce the weight of the wing and make it simpler to manufacture.

Figure 1A:
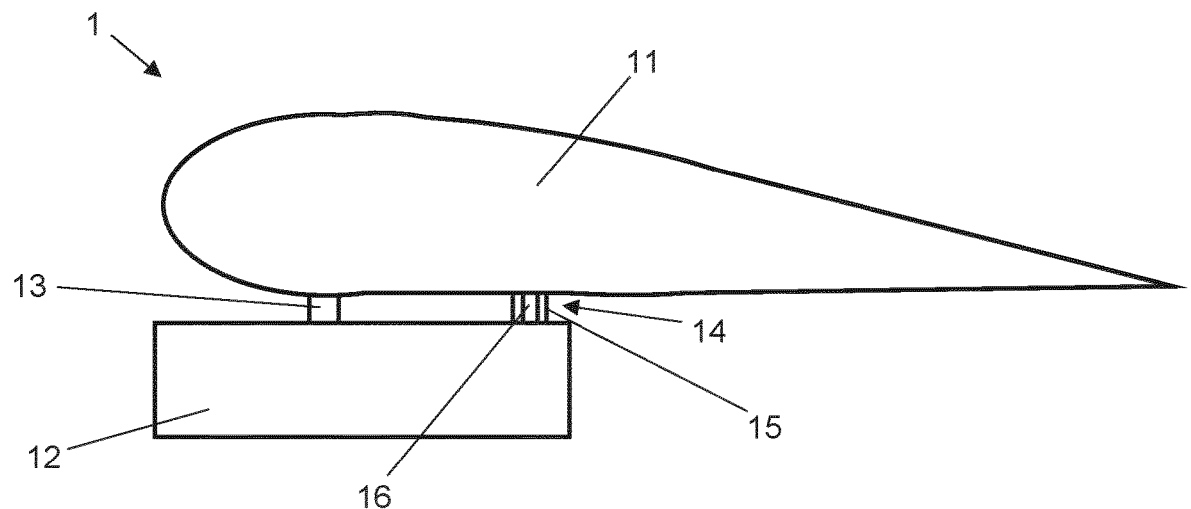
FIG. 1a is a schematic side view of an example aircraft assembly according to the invention.
Figure 1B:
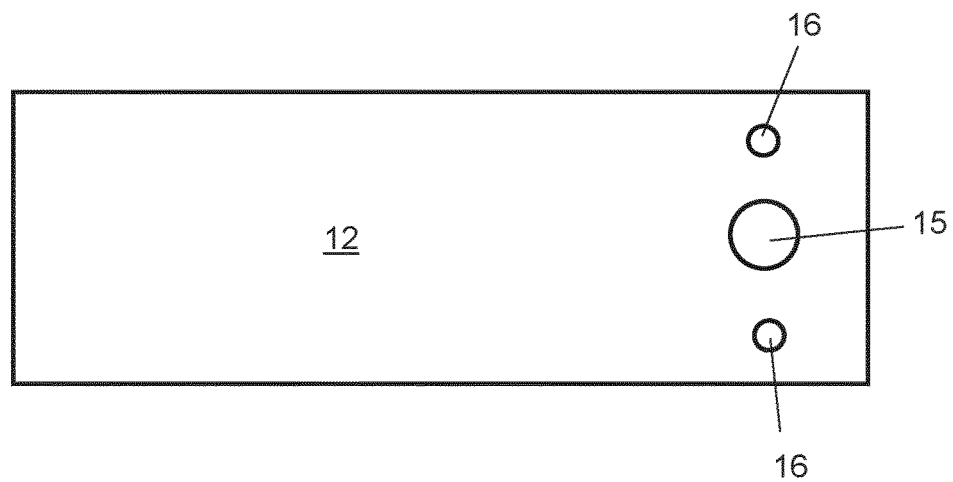

FIG. 1a is a schematic side view of an example aircraft assembly 1 according to the invention. The assembly 1 comprises a wing 11 and an engine mounting pylon 12. The pylon 12 is connected to the wing 11 by a forward connection 13 and an aft connection 14. The details of the forward connection 13 are not relevant to the present invention and so this feature will not be further described. The aft connection 14 comprises a spigot 15 and at least one fastener 16. FIG. 1b is a top view of the pylon 12, showing the arrangement of the spigot 15 and at least one fastener 16. It can be seen from FIG. 1b that the particular example assembly 1 comprises two fasteners 16, which are arranged one on either side of the spigot 15. The aircraft assembly 1 may be comprised in an aircraft of any type, although it may be particularly advantageous when used on a commercial airliner.

The spigot 15 extends substantially vertically with respect to a cruise orientation of the aircraft assembly 1. One end of the spigot 15 is fixedly attached to either a lower surface of the wing 11 or an upper surface of the pylon 12. The other (free) end of the spigot 15 is engaged with an opening (not shown) in the other of the lower surface of the wing 11 and the upper surface of the pylon 12. The engagement of the spigot 15 with the opening permits some axial movement of the spigot relative to the opening. However; relative radial movement of the spigot 15 and opening is constrained by the engagement between the spigot 15 and the opening, as will be described further below. In some examples the spigot 15 is a failsafe spigot. For example, the spigot may comprise an inner pin nested within an outer pin, each of which is individually able to withstand and transfer a predetermined load. The predetermined load is least as great as the load expected to be experienced by the spigot 15 during operation of an aircraft in which the assembly 1 is comprised.

Figure 2A:
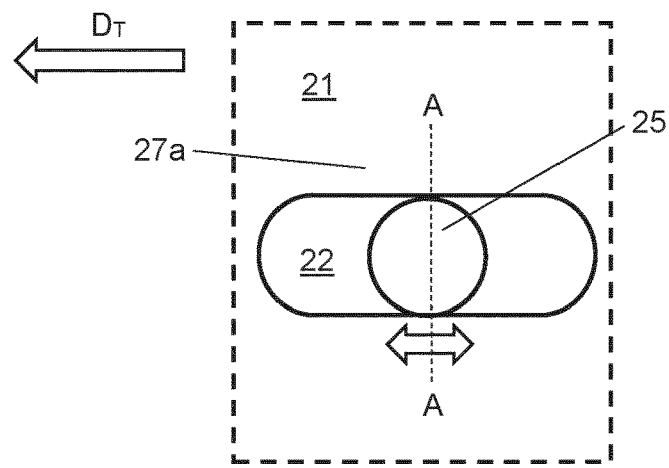
FIG. 2a is a schematic view of an example spigot for an aircraft assembly according to the invention, engaged with a first example opening for an aircraft assembly according to the invention.
Figure 2B:
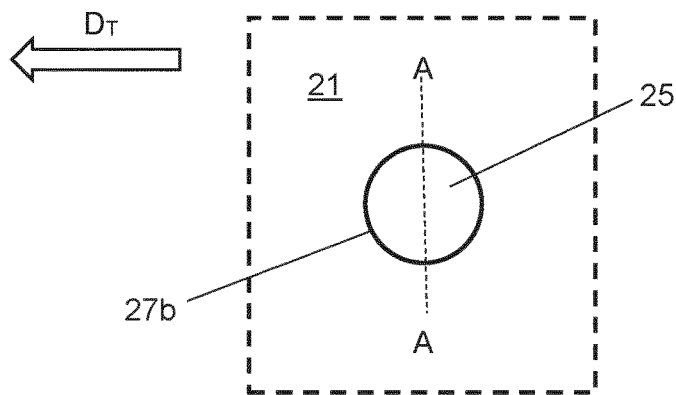
FIG. 2b is a schematic view of an example spigot for an aircraft assembly according to the invention, engaged with a second example opening for an aircraft assembly according to the invention.

FIGS. 2a and 2b show an example spigot 25, which is fixedly mounted on the upper surface of an engine mounting pylon 22 (only visible in FIG. 2a). The spigot 25 extends upwardly from the upper surface of the pylon 22. The spigot 25 is shown engaged with two different example openings 27a and 27b, each of which is formed in a lower surface of a wing 21.

The first example opening 27a comprises a slot having substantially the same width as the diameter of the spigot 25, but a length significantly greater than the diameter of the spigot 25. The long axis of the slot extends parallel to the direction of travel $D_T$ of an aircraft comprising the wing 21 and pylon 22. The width of the opening 27a may be slightly larger than the diameter of the spigot 25, in order to permit relative vertical (axial) movement of the spigot 25 and opening 27a. The first example opening 27a is configured to substantially prevent relative lateral (or radial) movement of the spigot 25 and opening 27a in directions perpendicular to the direction of travel $D_T$. However; some relative lateral (radial) movement of the spigot 25 and opening 27a is permitted in the direction of travel $D_T$. The amount of relative movement along the direction $D_T$ that is permitted depends on the length of the opening 27a. The length of the opening 27a is great enough to accommodate manufacturing tolerances associated with the wing 21 and the pylon 22. Joining of the pylon 22 and wing 21 is thereby facilitated. An aircraft assembly comprising the spigot-opening combination of FIG. 2a is configured such that the spigot transfers only lateral load perpendicular to the direction of travel of the aircraft. In such examples no thrust load is transferred by the spigot 25. Such an assembly may comprise a forward connection (or some other feature) configured to transfer lateral load between the pylon 22 and wing 21 in directions parallel to the direction of travel (i.e. thrust load).

The second example opening 27b, shown in FIG. 2b, is shaped to match the circumferential shape of the spigot 25. The second example opening 27b is thereby configured to substantially prevent all relative lateral (radial) movement of the spigot 25 and opening 27b. In the illustrated example, the spigot 25 has a circular cross-section and the opening 27b comprises a cylindrical recess having a diameter substantially equal to the diameter of the spigot 25. The diameter of the opening 27b may be slightly larger than the diameter of the spigot 25, in order to permit relative vertical movement of the spigot 25 and opening 27b. An aircraft assembly comprising the spigot-opening combination of FIG. 2b is configured such that the spigot transfers lateral load parallel to and perpendicular to the direction of travel of the aircraft. In such examples thrust load is transferred by the spigot 25. Such an assembly may comprise a forward connection configured to transfer lateral load between the pylon 22 and wing 21 only in directions perpendicular to the direction of travel.

Figure 2C:
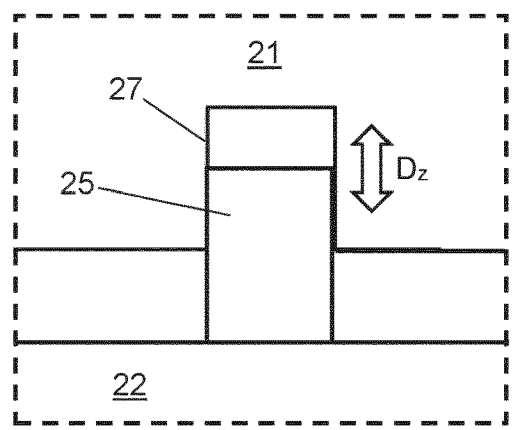
FIG. 2c is a cross section through the example spigot and opening of FIG. 2a or the example spigot and opening of FIG. 2b.

FIG. 2c shows a cross-section through the spigot-opening combinations of FIGS. 2a and 2b, along the line A-A. This cross-section looks the same for both openings 27a and 27b. FIG. 2c shows the wing 21 and pylon 22 in a "nominal" configuration corresponding to a situation where the aircraft is on the ground. It can be seen from FIG. 2c that the opening 27 (which in this example has the form of a recess) is configured to permit a certain amount of movement in the vertical direction $D_z$ of the spigot 25 relative to the opening 27. The amount of relative vertical movement permitted depends on the depth of the recess and on how close the distal end of the spigot 25 is to the base of the recess in the nominal configuration. In some examples the recess and/or the spigot is configured such that all relative vertical (axial) movements of the spigot 25 and opening 27 that are expected to occur during operation of the aircraft can be accommodated.

Both of the spigot-opening combinations shown in FIGS. 2a-c are suitable to be comprised in the aft connection 14 of the example aircraft assembly 1 of FIGS. 1a and 1b. The spigot 25 and openings 27a, 27b may have any of the features of the corresponding structures of the assembly 1 described above in relation to FIGS. 1a and 1b. The configuration of the forward connection 13 may differ depending on the particular configuration of the aft connection 14. For example, if the aft connection 14 comprises the spigot-opening combination of FIG. 2a, then the forward connection 13 may be configured to transfer thrust loads between the pylon 12 and the wing 11 (or the aircraft assembly may comprise some other mechanism for transferring thrust loads). By contrast, if the aft connection 14 comprises the spigot-opening combination of FIG. 2b then thrust loads will be transferred between the pylon 12 and wing 11 by the aft connection 14, such that it is not required for the forward connection 13 to also be configured to transfer thrust loads. However; such details of the forward connection 13 are outside the scope of the present invention, as previously noted.

Returning to FIGS. 1a and 1b, the (or each) fastener 16 comprises a tension bolt, of any suitable design. In the illustrated example, the assembly 1 comprises two fasteners 16, arranged symmetrically about the direction of travel of an aircraft comprising the assembly 1. In other examples the assembly 1 may comprise one, three or four fasteners 16, in any suitable arrangement. A larger number of fasteners 16 could be used, but this may be undesirable because of the resulting weight, cost and installation time penalties. In some examples, at least one of the fastener(s) 16 may be a failsafe fastener. In some examples, failsafe functionality is provided by the assembly 1 comprising at least twice as many fasteners 16 as are required to handle the operational loads expected to be experienced by the fasteners 16. In some examples, at least one of the fastener(s) 16 may be a blind fastener.

The or each fastener 16 passes through a fastener hole in the structure of the wing 11 and through a fastener hole in the structure of the pylon 12. Each of the fastener holes has a diameter significantly larger than the diameter of the stem of the fastener 16 which passes through that fastener hole so that a certain amount of relative lateral (radial) movement of the fastener 16 and fastener hole is permitted. This ensures that the (or each) fastener 16 transfers only vertical load between the engine mounting pylon 12 and the wing 11. The diameter of the fastener holes may be selected so as to accommodate all relative lateral movements of the fasteners 16 that are expected to occur during operation of the aircraft. In some examples the head end of the (or each) fastener 16 may abut the wing 11, in other examples the head end of the (or each) fastener 16 may abut the pylon 12, as is best suited to a preferred manufacturing process for the assembly 1.

Figure 3A:
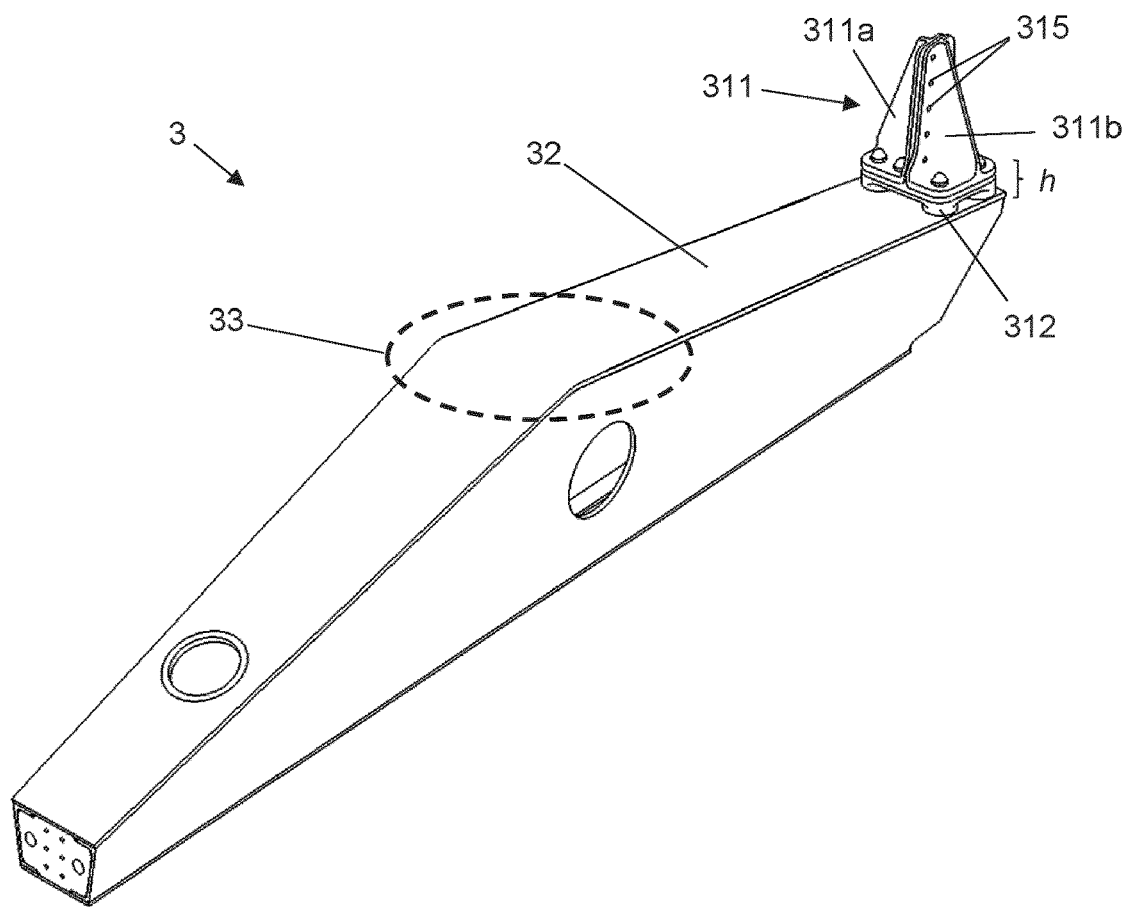
FIG. 3a is a perspective view of a further example aircraft assembly according to the invention, with most of the wing structure omitted.

FIGS. 3a-d show a particular example aircraft assembly 3 which comprises a wing 31 and an engine mounting pylon 32 suitable for a commercial airliner. The wing 31 and pylon 32 may have any of the features of the example wings 11, 21 and pylons 12, 22 described above. The wing 31 comprises a reinforcing bracket 311 disposed in an interior space of the wing 31, and a fitting 312 provided on a lower surface of a lower cover 313 of the wing 31. In FIG. 3a the main structure of the wing 31 has been omitted so that the bracket 311 and fitting 312 are visible. The fitting 312 and reinforcing bracket 311 are comprised in an aft connection of the aircraft assembly 3. The fitting 312 is fixedly attached to the reinforcing bracket 311 by fasteners 316 which pass through the lower cover 313 of the wing 31. The fitting 312 and reinforcing bracket 311 are configured to react loads transferred to the wing from the pylon 32 and to prevent excessive load from being transferred to the lower cover 313 of the wing 31. FIG. 3a shows the engine mounting pylon 32 with its aft end connected to the reinforcing bracket 311 and the fitting 312. The region 33 of the pylon 32 is configured to be connected to the wing 31 by a forward connection, but all features relating to the forward connection have been omitted from FIG. 3a as the forward connection is not relevant to the invention.

Figure 3B:
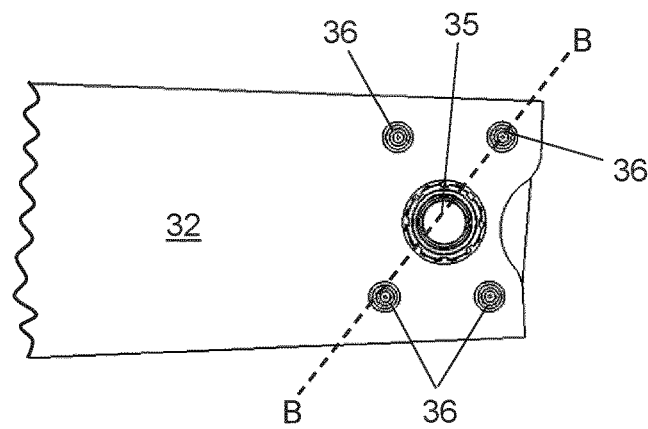

The engine mounting pylon 32 is connected to the reinforcing bracket 311 and the fitting 312 of the wing 31 by a spigot 35 and four fasteners 36. FIG. 3b is a top view of the aft end of the pylon 32, which shows the arrangement of the spigot 35 and fasteners 36. The spigot 35 and fasteners 36 may have any of the features of the example spigots 15, 25 and example fasteners 16, 26 described above. During operation of the aircraft assembly 3 on an aircraft, the spigot 35 transfers only lateral load between the engine mounting pylon 32 and the wing 31 and each of the fasteners 36 transfers only vertical load between the pylon 32 and the wing 31.

Figure 3C:
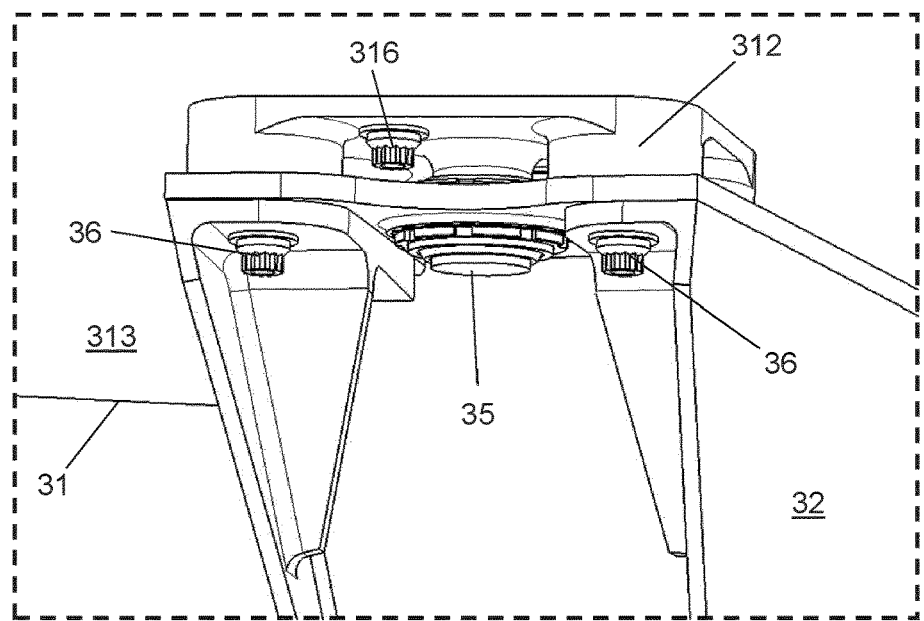
Figure 3D:
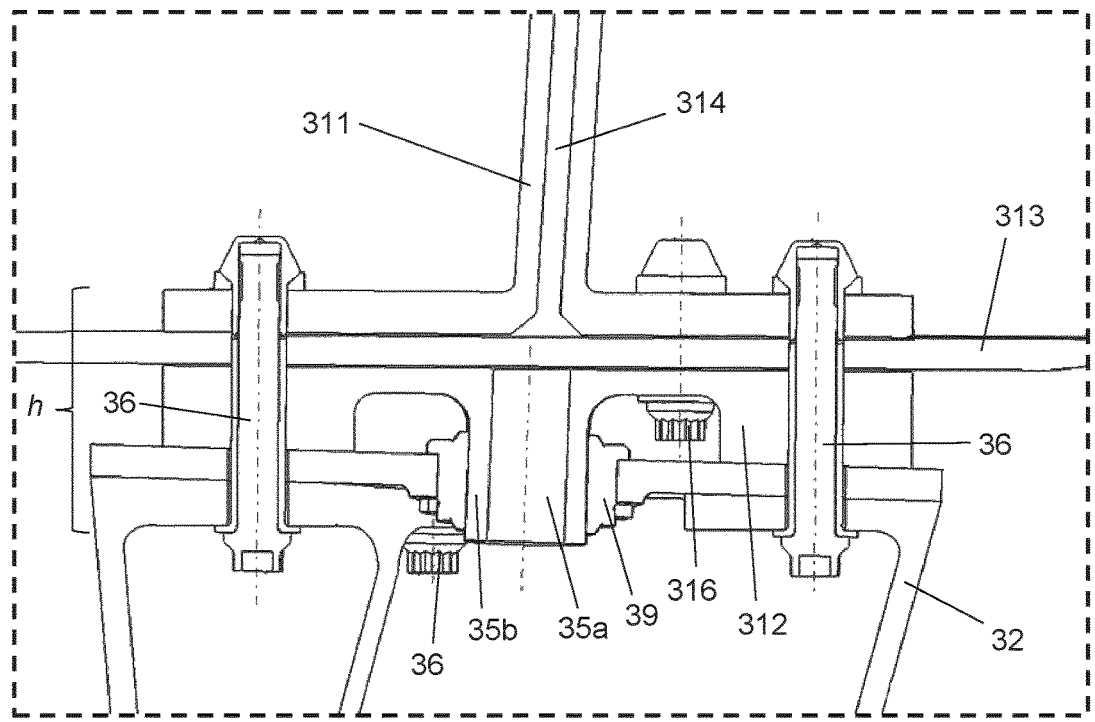

FIGS. 3c and 3d show the structure of the aft connection between the wing 31 and pylon 32 in detail. FIG. 3c is a perspective view of the assembly 3, looking forwards from behind the pylon 32. The aft side wall of the pylon 32 has been omitted from FIG. 3c so that the interior space of the pylon 32 is visible. FIG. 3d is a cross-section through the assembly 3, along the line B-B of FIG. 3b.

The spigot 35 is formed integrally with the fitting 312 and extends downwardly from the lower surface of the fitting 312 (the fitting 312 is considered to form part of the lower surface of the wing 31). The spigot 35 is a failsafe spigot comprising an inner pin 35a nested within an outer pin 35b. Each of the inner pin 35a and the outer pin 35b is configured to individually be able to withstand and transfer the full load expected to be experienced by the spigot 35 during operation of an aircraft in which the assembly 3 is comprised. The distal (free) end of the spigot 35 is received within a circular opening in the top of the pylon 32. The opening is lined with a bush 39 (visible in FIG. 3d), which functions as a plain bearing during any relative axial movements of the spigot 35 and pylon 32. The shape of the opening matches the circumferential shape of the spigot 35, meaning that substantially all relative lateral (radial) movement of the spigot 35 and pylon 32 is prevented by the engagement of the spigot 35 with the opening. In other examples the spigot 35 could be provided on the top surface of the pylon 32 instead of on the lower surface of the fitting 312, in which case the fitting 312 would comprise an opening for receiving the free end of the spigot 35.

Each fastener 36 comprises a tension bolt. Each fastener 36 extends through a stack of structures comprising the top wall of the pylon 32, the fitting 312, the lower cover panel 313 of the wing 31, and a flange of the reinforcing bracket 311. The holes in the structures through which the stem of each fastener 36 extends have a larger diameter than the diameter of the fastener stem, to avoid any transfer of lateral loads between the fastener 36 and the structures through which it passes. The head ends of the fasteners 36 are disposed within the interior space of the pylon 32. In this particular example, the fasteners 36 are blind fasteners, such that access to the tail end of the fasteners 36 is not required during installation of the fasteners 36. This means that access to an interior space of the wing 31 is not required during a process of forming the assembly 3. In other examples, it may be advantageous for the head ends of one or more of the fasteners 36 to be disposed within the interior space of the wing 31, e.g. to avoid needing to access the interior space of the pylon 32 during a process of forming the assembly 3.

The reinforcing bracket 311 comprises two sections, 311a and 311b, each of which has substantially the same configuration. Each section 311a, 311b has a horizontal flange having a lower surface configured to conform to an inside surface of the lower cover 313 of the wing 31, and a vertical flange having an inner surface configured to conform to a side surface of a rib 314 (visible in FIG. 3d) of the wing 31. The sections 311a, 311b are disposed on opposite sides of the rib 314. The vertical flanges are fastened to each other, through the rib 314, by a plurality of fasteners 315. Each horizontal flange is fastened to the fitting 312, through the lower wing cover 313, by at least one fastener 316. The reinforcing bracket 311 functions to receive tension load from the pylon 32 via the fasteners 36, and lateral load from the pylon 32 via the fasteners 316, and to transfer these loads to the rib 314. The size, shape and material composition of the reinforcing bracket 311 are selected in dependence on the requirements of the particular application.

The fitting 312 is shaped such that it has an upper surface which conforms to a lower surface of the lower wing cover 313. The shape and size of the upper surface of the fitting 312 corresponds to the shape and size of the combined lower surfaces of the horizontal flanges of the reinforcing bracket 311. The fitting 312 additionally comprises a lower surface which conforms to (and therefore is in close contact with) the upper surface of the pylon 32 across one or more regions which encompass the locations of the fasteners 36. The size of the contact region(s) is selected to facilitate the transfer of tension loads from the pylon 32 to the reinforcing bracket 311. The fitting 312 functions to receive lateral load from the pylon 32 (via the spigot 35) and to transfer this lateral load to the reinforcing bracket 311 (via the fasteners 316). The size, shape and material composition of the fitting 312 are selected in dependence on the requirements of the particular application. However; preferably the vertical height of the fitting is less than 300 mm. In some examples the vertical height of the fitting is less than 100 mm.

In the illustrated example the structure of the pylon 32 is configured to be strong enough to transfer operational loads resulting from the thrust and mass of an engine mounted on the pylon 32 to the wing 31, by means of reinforcing structures formed integrally with the pylon 32. In other examples, one or more reinforcing brackets similar to the reinforcing bracket 311 may be provided on and/or in the pylon, to locally increase its strength at the locations of load transfer.

It can be seen from FIGS. 3*a-d* that the overall vertical height h of the aft connection between the wing 31 and pylon 32 is very small compared with the vertical height of the pylon 32. The overall vertical height of the aft connection comprised in the assembly 3 is also very small compared with the vertical height of other known mechanisms for connecting the aft end of a pylon to a wing. This means that torsional loads transferred to the wing lower cover 313 and the reinforcing bracket 311 as a result of swinging or twisting movements of the pylon 32 (which are to be expected during normal operation of an aircraft in which the assembly 3 is comprised) are significantly smaller than would be the case with connections having a greater vertical height. This allows the reinforcing bracket 311 to be significantly smaller and lighter than is possible with other known designs of aft connection.

Figure 4:
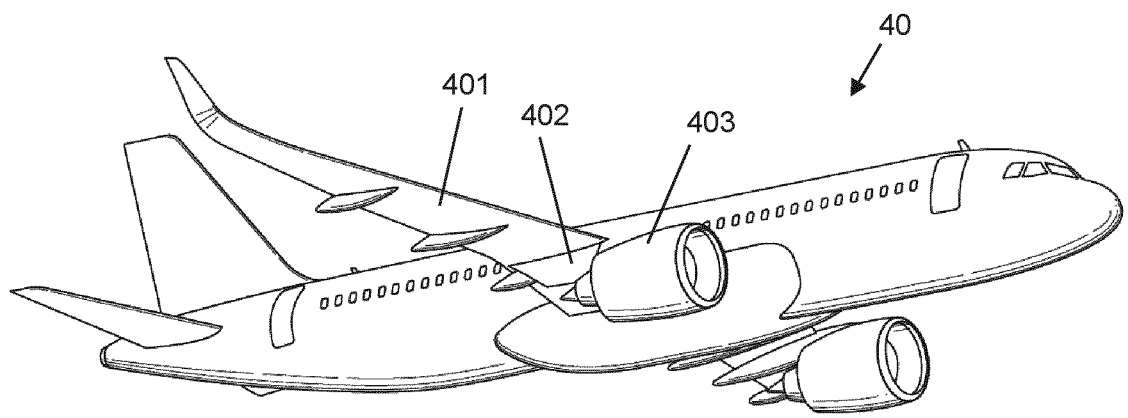
FIG. 4 is a perspective view of an example aircraft comprising an aircraft assembly according to the invention.

FIG. 4 shows an example aircraft 40 which comprises one or more aircraft assemblies according to the invention. In particular, the aircraft 40 comprises a wing 401, to which an engine mounting pylon 402 is attached. The wing 401 and pylon 402 together form an aircraft assembly according to the invention, such as either of the example assemblies 1, 3 described above, and accordingly an aft end of the engine mounting pylon 402 is connected to the wing 401 in the manner described above. An Ultra-High-Bypass Ratio (UHBR) engine 403 is mounted on the engine mounting pylon 402. The engine mounting pylon 402 is close-coupled to the wing 401. The aircraft 40 also includes a further wing, engine mounting pylon and UHBR engine. The further wing and engine mounting pylon may also be comprised in an aircraft assembly according to the invention.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. An aircraft assembly comprising:
a wing having a lower surface and an upper surface; and
an engine mounting pylon;
wherein an aft end of the engine mounting pylon is connected to the wing by a failsafe spigot having a free end and at least one fastener,
a fitting disposed between the lower surface of the wing and the failsafe spigot, and
wherein one end of the failsafe spigot is fixedly attached to either the fitting or the upper surface of the pylon at the other end of the failsafe spigot, and the other end of the failsafe spigot is engaged with an opening in the other of the fitting and the upper surface of the pylon so as to permit axial movement of the failsafe spigot relative to the opening so that, during operation of the aircraft assembly on an aircraft,
the failsafe spigot transfers only lateral load between the engine mounting pylon and the wing and the at least one fastener transfers only vertical load between the engine mounting pylon and the wing,
wherein the failsafe spigot further comprises an inner pin nested within an outer pin, each of which is individually able to withstand and transfer a predetermined load,
wherein the opening is lined with a symmetrically substantially cylindrical bush disposed on an outer surface of the outer pin, and wherein the bush is configured to permit any relative axial movement of the spigot and pylon,
wherein the bush includes an inner surface in direct contact with the outer surface of the outer pin, and
wherein the direct contact of the inner surface with the outer surface creates a continuous circumferential interface along an entire length of the bush.

2. The aircraft assembly according to claim 1, configured such that the spigot transfers only lateral load perpendicular to the direction of travel of the aircraft.

3. The aircraft assembly according to claim 2, wherein the opening comprises a slot having a long axis which extends parallel to the direction of travel of the aircraft.

4. The aircraft assembly according to claim 1, configured such that the spigot transfers lateral load parallel to and perpendicular to the direction of travel of the aircraft.

5. The aircraft assembly according to claim 4, wherein the opening is configured to match the cross-sectional profile of the spigot such that relative lateral movement of the spigot and the opening is substantially prevented.

6. The aircraft assembly according to claim 1, wherein the wing comprises a lower cover, and wherein the fitting is attached to the lower cover.

7. The aircraft assembly according to claim 6, wherein the fitting is between a top surface of the engine mounting pylon and the lower cover.

8. The aircraft assembly according to claim 1, wherein the vertical height of the fitting is less than 100 mm.

9. The aircraft assembly according to claim 1, wherein the at least one fastener is a failsafe fastener.

10. An aircraft comprising the assembly of claim 1.

11. The aircraft assembly according to claim 1, further comprising an ultra-high bypass ratio (UHBR) engine mounted on the engine mounting pylon.

* * * * *